United States Patent
Magnusson et al.

(10) Patent No.: US 7,835,320 B2
(45) Date of Patent: Nov. 16, 2010

(54) MULTIPLE ACCESS COMMUNICATIONS OVER DIVERSE ACCESS TECHNOLOGIES

(75) Inventors: Per Olof Magnus Magnusson, Linkoping (SE); Mikael Prytz, Ronninge (SE); Joachim Sachs, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 380 days.

(21) Appl. No.: 11/574,713

(22) PCT Filed: Sep. 6, 2004

(86) PCT No.: PCT/SE2004/001283

§ 371 (c)(1),
(2), (4) Date: Mar. 5, 2007

(87) PCT Pub. No.: WO2006/028409

PCT Pub. Date: Mar. 16, 2006

(65) Prior Publication Data

US 2008/0031188 A1    Feb. 7, 2008

(51) Int. Cl.
H04W 4/00    (2009.01)
(52) U.S. Cl. .................................. 370/329; 370/229
(58) Field of Classification Search .............. 370/230, 370/230.1, 235, 241, 401
See application file for complete search history.

(56) References Cited

U.S. PATENT DOCUMENTS

| | | | |
|---|---|---|---|
| 7,082,301 B2 * | 7/2006 | Jagadeesan et al. ......... 455/436 |
| 7,317,682 B2 * | 1/2008 | Gu et al. ..................... 370/230 |
| 7,388,832 B2 * | 6/2008 | Nagato et al. ............... 370/230 |
| 7,440,404 B2 * | 10/2008 | Nagesh et al. .............. 370/235 |
| 2002/0102987 A1 * | 8/2002 | Souisse et al. ............. 455/454 |
| 2003/0212798 A1 * | 11/2003 | Furuskar et al. ............ 709/227 |
| 2004/0242186 A1 * | 12/2004 | Thanh et al. ................ 455/403 |
| 2006/0034251 A1 * | 2/2006 | Sivabalan et al. ........... 370/351 |
| 2006/0120282 A1 * | 6/2006 | Carlson et al. .............. 370/229 |

FOREIGN PATENT DOCUMENTS

WO    WO-03088686 A1    10/2003

OTHER PUBLICATIONS

Wang, et al., 'Towards Providing QoS for Integrated Cellular and WLAN Networks, Jun. 2003,' Post Graduate Networking Conference (PGNet2003), Liverpool, UK.
Wang, et al., 'An Adaptive QoS Management Scheme for Interworking Cellular and WLAN Networks, Mar. 29-31, 2004, pp. 145-150,' 7th UK Simulation Society Conference (UKSim2004), Oxford, UK.
Murray, et al., 'State of the Art: Admission Control and Mobility Management in Heterogeneous Wireless Networks, May 2003'TSSG, Waterford Institute of Technology Cork Rd, Waterford, Ireland.
Mantilla, et al., 'A QoS Framework for Heterogeneous Wireless Networks using a Multiagent System, May 2003,'European Wireless 2004, The Fifth European Wireless Conference Mobile and Wireless Systems Beyond 3G, Girona University, Spain.

* cited by examiner

*Primary Examiner*—Brian D Nguyen
(74) *Attorney, Agent, or Firm*—Roger S. Burleigh

(57) ABSTRACT

The present invention relates to communications. More especially it relates to multiple access communications over diverse access technologies. Particularly it relates to multiple radio access technologies and heterogeneous networks and admission control for multi-technology access, the admission control serving one or more communication sessions over more than one access technology at the same time.

18 Claims, 4 Drawing Sheets

MULTIPLE ACCESS COMMUNICATIONS OVER DIVERSE ACCESS TECHNOLOGIES

TECHNICAL FIELD OF THE INVENTION

The present invention relates to communications. More especially it relates to multiple access communications over diverse access technologies. Particularly it relates to multiple radio access technologies and heterogeneous networks.

BACKGROUND AND DESCRIPTION OF RELATED ART

For communications there exists a variety of access technologies and more access technologies are being developed to meet ever-increasing demand for capacity and requirements on maximum response times, time jitter etc. Particularly, for radio communications different technologies such as GPRS (General Packet Radio Services) UMTS (Universal Telecommunications Systems) and WLAN (Wireless Local Area Network) it is known to transmit packet data over one of a plurality of available networks.

A network operating according to only one access technology we call a homogeneous network. A network including different access technologies we call a heterogeneous network.

X. G. Wang, J. Mellor and K. Al-Begain, '*Towards Providing QoS for Integrated Cellular and WLAN Networks,*' Post-Graduate Networking Conference (PGNet2003), Liverpool, UK, June 2003, describes interconnecting WLAN radio access network with 3G or 2G cellular network as an efficient way to enhance network operator service. The publication discusses two different methods for merging WLAN and cellular networks, loose coupling and tight coupling. For the loose coupling WLAN and cellular networks are two separate access networks, with connected core networks. For the tight coupling they suggest WLAN to be employed as a new radio access technology within the cellular system. Regardless of the access technology, for tight coupling there would only be one common cellular core network. According to the prior art QoS model structure, a CAC (Connection Admission Control) Module admits the number of flows that can be served and allocates bandwidth to the flows through signaling to all the network nodes along the traffic path. It also needs to maintain the QoS requirements of existing connections. CAC uses some reservation protocols, e.g. RSVP, to book the actual resource for users' flow. The publication suggests a user-triggered handover when roaming from cellular networks into WLAN and a normal handover when roaming from WLAN into cellular networks.

X. G. Wang, G. Min, J. Mellor, K. Al-Begain, L. Guan, '*An adaptive QoS management scheme for interworking cellular and WLAN networks,*' 7th UK Simulation Society Conference (UKSim2004), Oxford, UK, Mar. 29-31, 2004, pp. 145-150, addresses various challenges generated by designing an integrated WLAN and 3G network and presents simulation experiments and results concerning resource utilization, call blocking probability and handoff dropping probability.

Ken Murray, Dirk Pesch: '*State of the Art: Admission Control and Mobility Management in Heterogeneous Wireless Networks,*' TSSG, Waterford Institute of Technology Cork Rd, Waterford, Ireland, May 2003, discusses seamless intersystem roaming across heterogeneous networks. The motivation for heterogeneous networks arises from the fact that no one technology or service can provide ubiquitous coverage and continuous high QoS (Quality of Service) levels across multiple spaces. It will therefore be necessary for a mobile terminal to employ various points of attachment to maintain connectivity to a corresponding node at all times. Both packet and circuit switched services can be freely mixed, with variable bandwidth and delivered simultaneously to the same user with specific quality level. Satellite networks promise global coverage and total ubiquitous computing but with lower QoS constraints than its cellular counterparts, while WLAN provides high-speed data service (up to 11 Mb/s with 802.11b and 54 Mb/s with 802.11a/g) over a geographically small area. The technologies differ in bandwidth, latency, power consumption and cost. Admission control and mobility management strategies facilitate load balancing between access networks. Users can be forced to handover to another network to make way for users with more demanding bandwidth requirements and can thus prioritize users. It may be possible using an admission control algorithm to admit a user to multiple networks simultaneously and use multiple connections to deliver services to the user and thus achieve a higher QoS than that offered from a single network. If multiple networks are available to a user at any one time, then choosing the most optimal network for a particular service delivery and choosing the correct time to execute a vertical handover to improve the QoS for all users are important factors. The publication describes Fuzzy Logic concepts for handover initiation, network selection and handover execution. The document concludes that admission control schemes across heterogeneous networks based on radio channel characteristics, resource availability, QoS constraints and user policy still remains an open issue.

C. A. Mantilla, J. L. Marzo, '*A QoS Framework for Heterogeneous Wireless Networks using a Multiagent System,*' European Wireless 2004, The Fifth European Wireless Conference Mobile and Wireless Systems beyond 3G, February, 2004, describes QoS in heterogeneous wireless network, multiagent systems and a QoS Framework in heterogeneous wireless networks using a multiagent system. The document proposes a multiagent system, where each access point in each technology or network has a group of agents with different roles, cooperating or competing. The global functions of the MAS (MultiAgent System) include call admission control to accept or to reject an incoming call, registration of the call with the security policies, resource allocation QoS parameters mapping with a new network and execution of handover. A radio resource manager agent is responsible of the status of the access point, the available resources and the execution of horizontal handover, or handover within a technology, and vertical handover, or handover between access technologies.

E. Mohyeldin, M. Dilinger, E. Schulz and J. Luo, '*Joint admission control and scheduling algorithm in tightly coupled heterogeneous networks,*' 6th WWRF Meeting in London, England, June 2002, presents two-stage Admission Control and Resource Scheduling for tightly coupled subnetworks (UMTS and WLAN). A radio network controller, RNC, owns and controls the radio resources of all the subnetworks in its domain, where the interworking between subnetworks mostly goes through the RNC. Incoming traffic inside of the systems is divided into different traffic types after a first stage of Joint Session Admission Control, JOSAC. A second stage of Session Admission Control, SAC, selects the transmission physical mode of bearer service or drop the application in case the network cannot provide the requested service. Based on the chosen static service and network profile in the first stage, the first stage of the admission control assigns a certain range for the weights defined for the service types based on the network, terminal and user profiles, which are offered to the second stage. The tightly coupled traffic stream over two RATs (Radio Access Technologies) is scheduled by JOSCH (Joint Radio Resource Scheduling), working between the first and second stage. The split traffic after JOSCH is forwarded to individual SAC in each RAT defined sub-network with delay bounds. SAC maps the split traffic, with offered control information from JOSCH, into conventional traffic type with a concrete priority weight. The QoS class dimension of the scheduling allocates resources for different QoS classes. The joint admission control assigns radio resource to the corresponding amount of traffic in each sub-network according to the load of the sub-network, the expected traffic model and the feasibility of traffic splitting.

J. Luo, E. Mohyeldin, N. Motte, M. Dilinger, '*Performance Investigations of ARMH in a Reconfigurable Environment*' SCOUT Workshop, September, 2003, discusses the ARMH (Adaptive Radio Multi Homing) concept for tightly coupled radio access technologies, RATs, and investigates simultaneous connections in individual radio networks with the support of multiple radio addresses belonging to terminals. For joint admission control, the traffic cannot be split; the session/messages cannot be split over different networks, but can be admitted alternatively to a different one for packet switched communications. JOSAC can only give a gain due to traffic routing, or alternatively, traffic diversion to a different system. The JOSCH offers the detailed traffic splitting.

In case a mobile terminal has simultaneous connections supported by reconfigurable terminals, data flows and control commands can be routed via different air interfaces, which have different delay characteristics in terms of average delay and delay variance (jitter). The traffic split is motivated by a reduced load over individual networks, thereby providing higher trunking gain as seen by radio resource management, RRM, and better QoS as seen by a user if traffic splitting is designed according to user profile and demands, and network architecture.

The document mentions an example, a terminal demanding a scalable video service from a remote server through tight coupled sub-networks (UMTS and WLAN). Both networks assumed to be controlled by a common RNC. In order to establish simultaneous sub-streams belonging to the same video context, RNC first receives an application or a request from a mobile terminal with multiple radio accesses/addresses. The RNC applies to or urges a remote server for traffic splitting, indicating average rate in each sub-link. Traffic is split and sent to the RNC, which receives the split traffic and maps it to the tightly coupled sub-networks. The split traffic comprises labeled (for each sub-network) and time-indexed packets. A synchronization mechanism in RNC remedies delays generated by the radio sub-networks.

International Patent Application WO03088686 reveals a method of multi-service allocation in multi-access systems. Users of a given service in a wireless communication system that includes a plurality of multi-service sub-systems are allocated to one of the sub-systems in accordance with a combined capacity region of the wireless communication system. The combined capacity region is determined based upon capacity regions of each of the plurality of multi-service sub-systems, which capacity regions are determined using a relative decrease in users of a first service as a function of an increase in users of a second service.

None of the cited documents above discloses admission control for multi-technology access, the admission control serving one or more sessions, each received by a multi-technology access system in one data flow, over more than one access technology at the same time by dividing a session over available access technologies, the dividing being performed within the access system, or by splitting individual data flows over more than one access technology. Furthermore, none of the cited documents reveals access technology data-flow selection based on data security, or user or terminal preferences.

SUMMARY OF THE INVENTION

In multi-technology access admission control is an important part, as demonstrated in prior art. The main purpose of the multi-technology access admission control is to protect already established QoS agreements with the multi-technology access system. The invention proposes a method and system of multi-technology access admission control satisfying this purpose while simultaneously improving system capacity and spectral efficiency of the overall multi-technology access system.

A general problem of multi-technology access systems is to fulfill various requirements of a session as regards, e.g. QoS, security or terminal specific requirements when transferring data. Another problem is how to incorporate such requirements when allocating traffic to the various access technologies of a heterogeneous system.

State of the art MTA technologies raise increased requirements on service providers or increase the risk of rejecting sessions and requiring unnecessarily high margins for reasonable drop rates of admitted sessions. Further, user requirements or terminal requirements on e.g. security are not guaranteed.

Consequently, there is a need of providing multi-technology access admission control splitting sessions into a plurality of data flows not imposing increased requirements on various providers of data services and guaranteeing various specifications not reserving more than minimum resources for resource margins, while providing sufficiently low drop rates for admitted sessions.

It is consequently an object of the present invention to achieve a multi-technology access admission control which can provide splitting of one or more communication sessions into a plurality of data flows for distribution over different access technologies.

A further object is to achieve a tentative admission control incorporating all admitted data flows of the respective access technologies when admitting a communication session.

It is also an object to achieve a method and system providing access technology selection and multi-access technology admission control incorporating security requirements or preferences of a user, terminal or service initiating a particular session.

Another object is to provide a multi-technology access admission control including prediction of service efficiency or resource needs for the various data flows of session splitting.

Finally, it is an object to increase session reliability in terms of drop probability of admitted sessions or, equivalently, reducing required resource margins of one or more of the various access technologies, or their admission control, involved in session distribution.

These objects are met by a method and system of tentative multi-technology access admission control.

DESCRIPTION OF PREFERRED EMBODIMENTS

In multi-technology access, MTA, admission control is an important part, as demonstrated in prior art. The main purpose of the MTA admission control, MTAC, is to protect already established QoS agreements with the MTA system. The invention proposes a method and system of MTAC satisfying this purpose while simultaneously improving system capacity and spectral efficiency of the overall MTA system.

Figure 1:
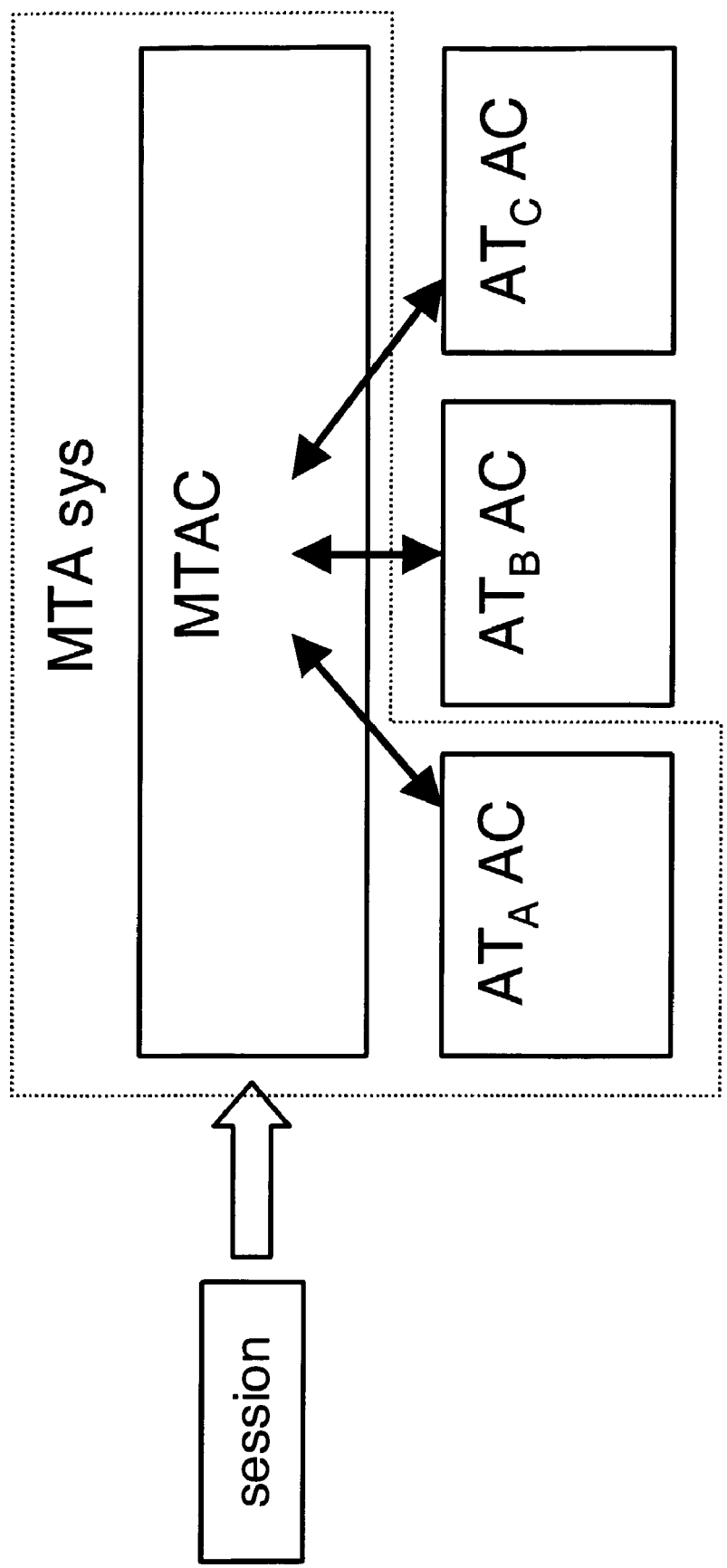
FIG. 1 illustrates MTA admission control according to the invention.

FIG. 1 illustrates MTA admission control according to the invention. The MTA system <<MTA sys>> coordinates several heterogeneous access technologies, ATs <<$AT_A$>>, <<$AT_B$>>, <<$AT_C$>>. The MTA system can route traffic over more than one access technology <<$AT_A$>>, <<$AT_B$>>, <<$AT_C$>> for an individual communication sessions <<session>>, either by allocating different sessions' <<session>> data flows to different ATs <<$AT_A$>>, <<$AT_B$>>, <<$AT_C$>> or by splitting individual data flows over more than one access technology <<$AT_A$>>, <<$AT_B$>>, <<$AT_C$>>.

The individual access technologies <<$AT_A$>>, <<$AT_B$>>, <<$AT_C$>> may be aware of the MTA system <<MTA sys>> as indicated in FIG. 1 by a dashed line enclosing MTA admission control <<MTAC>> and the integrated access technology <<$AT_A$>>, or unaware of the MTA system <MTA sys>> as for two example access technologies <<$AT_B$>>, <<$AT_C$>> indicated in the figure by the dashed line not enclosing the two unintegrated example access technologies, <<$AT_B$>>, <$AT_C$>>. The integrated access technology <<$AT_A$>> is, e.g., an access technology designed to take advantage of all capabilities of the MTA system <<MTA sys>>, whereas the unintegrated access technologies <<$AT_B$>>, <<$AT_C$>> are, e.g., legacy access technologies, originally designed to operate stand-alone.

The unintegrated example access technologies, <<$AT_B$>>, <<$AT_C$>> each comprises homogeneous network admission control <<$AT_B$AC>>, <<$AT_C$ AC>> according to prior art. Also the integrated example access technology can comprise homogeneous admission control <<$AT_A$ AC>> according to prior art. Preferably, however, the respective admission control <<$AT_A$ AC>> of integrated access technologies is integrated with the MTA admission control <<MTAC>>.

The MTA admission control <<MTAC>> determines whether or not a communication session should be admitted to the MTA system <<MTA sys>>. The MTA admission control <<MTAC>> entity preferably requests information about the capabilities of the individual access technologies <<$AT_A$>>, <<$AT_B$>>, <<$AT_C$>>, or as a less preferred alternative, the respective access technologies issues interrupts and pushes the information to the MTA admission control <<MTAC>> entity of the MTA system <<MTA sys>>.

Figure 2:
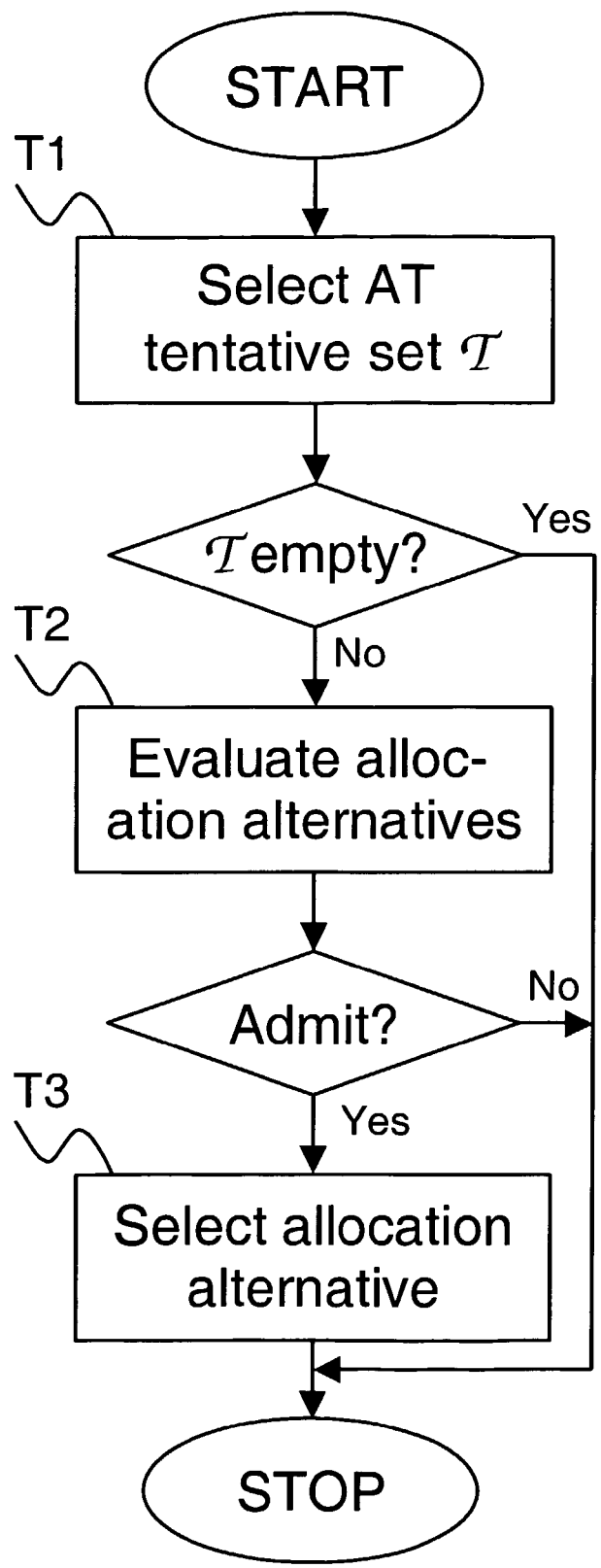
FIG. 2 illustrates schematically preferred MTA admission control performing three identified tasks, according to the invention.

The preferred MTA admission control performs three identified tasks, described in relation to FIG. 2 as three steps <<T1>>, <<T2>>, <<T3>>. The first task <<T1>> is forming an access technology tentative set T. This is performed in two sub-steps Form a preliminary set T* including access technologies that
  are available and provides required quality, and
  fulfils minimum non-divisible requirements for the communication session;

and

Verify that the preliminary set T* can achieve the minimum divisible requirements for the communication session.

An example of a minimum non-divisible requirement is a session requirement on delay. Another minimum non-divisible example requirement is secured/ciphered communication needs. A minimum non-divisible requirement is characterized in that it needs to be met by at least one access technology involved as a shortcoming of one access technology cannot be compensated by a superiority of another access technology, in order for the combined contributions to meet the requirement. Consequently, non-divisible requirements cannot be met by further splitting of data flows on more access technologies.

An example of a minimum divisible requirement is a minimum transmission rate requirement. The minimum example requirement would be fulfilled if the sum of transmission rate capabilities of the access technologies in the preliminary set T* is greater than or equal to the minimum transmission rate requirement. Another example minimum divisible requirement is reliability when different data flows can be diversity combined.

If the preliminary set T* in the first sub-step is empty or if the minimum divisible requirement of the second sub-step is not verified, the tentative set T is empty, the MTAC entity rejects the communication session and the admission process of the session stops. The tentative set T is set identical to the preliminary set T*, when verified.

The second task <<T2>> is evaluating allocation alternatives of a non-empty tentative set T from the first step <<T1>>. The purpose of the second step <<T2>> in the MTA admission control, MTAC, is to first generate a prioritized list of allocation alternatives from the tentative set T and evaluate the possibility of admission and potential impact on the resources, e.g. channel resources, of the access technologies for the various alternatives. Cardinality of the set T is denoted |T|.

If |T|=1, there is only one allocation alternative.

If |T|=2, there are at least three different alternatives, where three is the number of alternatives to select at least one out of two.

For the general case, if |T|=C, where C is an integer greater than zero, the number of allocation alternatives is equal to or greater than the number of alternatives to select at least one out of C.

In practice the number of access technologies considered is limited and consequently, the maximum cardinality $C_{max}$ also is limited.

There may be several, possibly conflicting objectives and aspects to consider when forming the prioritized list of allocation alternatives among the set of possible alternatives. An important aspect is that already established QoS agreements for existing users in the MTA system should be protected. This means that it is necessary to estimate the current resource allocation and the allocation increase for the different allocation alternatives.

Another aspect considered is that certain allocations may be less advantageous to provide some services than others. The fact that some services are only supported by some access technologies is captured already by the first task <<T1>>, where inappropriate technologies are not included in T. The evaluation of allocation alternatives preferably prioritizes the various allocation alternatives. Preferably also input from congestion control and resource utilization of the various access technologies is considered in the prioritization process.

Allocation alternatives that minimize channel resource consumption in a communications system comprising the MTA system, or that minimize energy consumption for a wireless terminal, typically a portable terminal, or (virtually equivalently) minimize number of access technologies involved for an admitted communication session is included in the prioritization process according to one mode of the invention.

In a further mode of the invention sub-requirements are defined for respective (sub-)flows of a communication session, where the (sub-)flows would be allocated over the access technologies selected from the tentative set. In some example allocations this results in a further split of data flows of a communication session into sub-flows.

When all allocation alternatives for consideration have been evaluated a prioritized ordered list of allocation alternatives is at hand. For admission the alternatives are considered from higher to lower priority, and the process then preferably stops at the first admissible allocation alternative identified.

Table 1 below illustrates an example prioritized ordered list, the alternatives being numbered from higher priority to lower.

TABLE 1

| Priority | Session flow | $AT_A$ | $AT_B$ | $AT_C$ |
| --- | --- | --- | --- | --- |
| 1 | Flow 1 | 100% | 0% | 0% |
|   | Flow 2 | 0% | 100% | 0% |
| 2 | Flow 1 | 0% | 0% | 100% |
|   | Flow 2 | 0% | 0% | 100% |
| 3 | Flow 1 | 50% | 50% | 0% |
|   | Flow 2 | 0% | 0% | 100% |

If the prioritized ordered list is empty, the communication session is not admitted and the allocation process stops.

Figure 3:
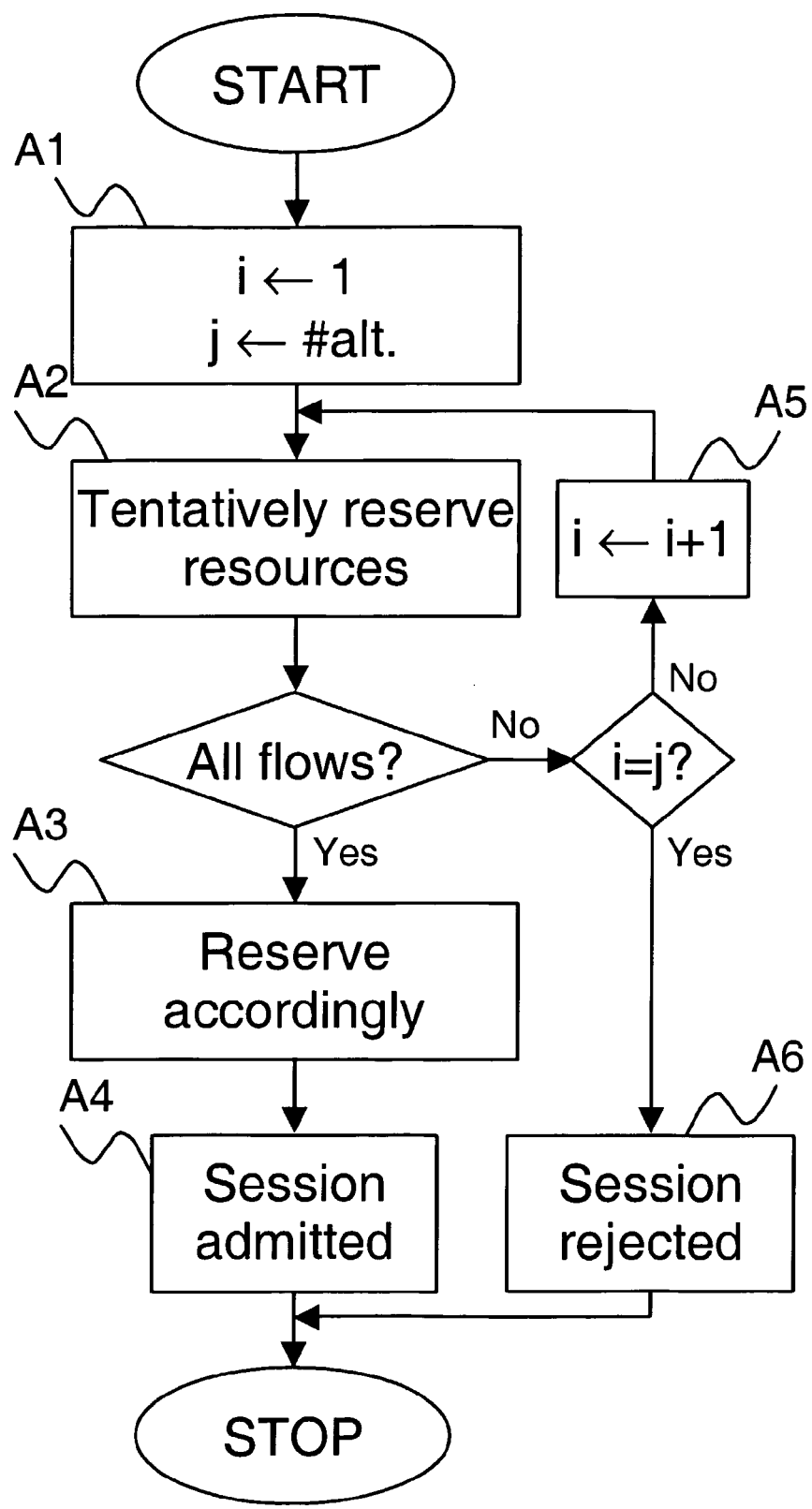
FIG. 3 illustrates a simplified flowchart for access technology selection for a communication session split according to the invention.

The third task <<T3>> is selecting allocation alternative from the prioritized ordered list. Since session flows may be split into sub-flows in order for the sub-flows to fulfil divisible requirements such that the sub-flows can be allocated to different access technologies, the selection of allocation alternative is preferably tentative over all allocations under the MTAC. The selection process in the selection step <<T3>> is illustrated in FIG. 3.

The allocation is started by initializing <<A1>> a counter i for counting the prioritized alternatives preferably starting with the alternative of highest priority. Also initialized <<A1>> is an integer j representing the number of alternatives <<#alt.>> in the prioritized ordered list. Resources for each flow according to the alternative considered <<i>> are reserved for each data flow or sub-flow, tentatively for each access technology <<A2>> by sending requests to each individual access technology admission control <<$AT_A$ AC>>, <<$AT_B$ AC>>, <<$AT_C$ AC>> (see FIG. 1) considered for allocation according to the prioritized alternative.

If resources can be reserved for all flows, they are reserved accordingly <<A3>> and the session is admitted <<A4>>. The selection step <<T3>> of FIG. 2 is thereby completed.

If resources cannot be reserved for all flows of the instant alternative of the ordered list, the next alternative <<A5>> of the prioritized ordered list is investigated as described above, unless the instant alternative was the last in the prioritized ordered list, in which case the session is rejected <<A6>>.

When the session is either admitted <<A4>> or rejected <<A6>>, the selection step <<T3>> of FIG. 2 is completed.

Figure 5:
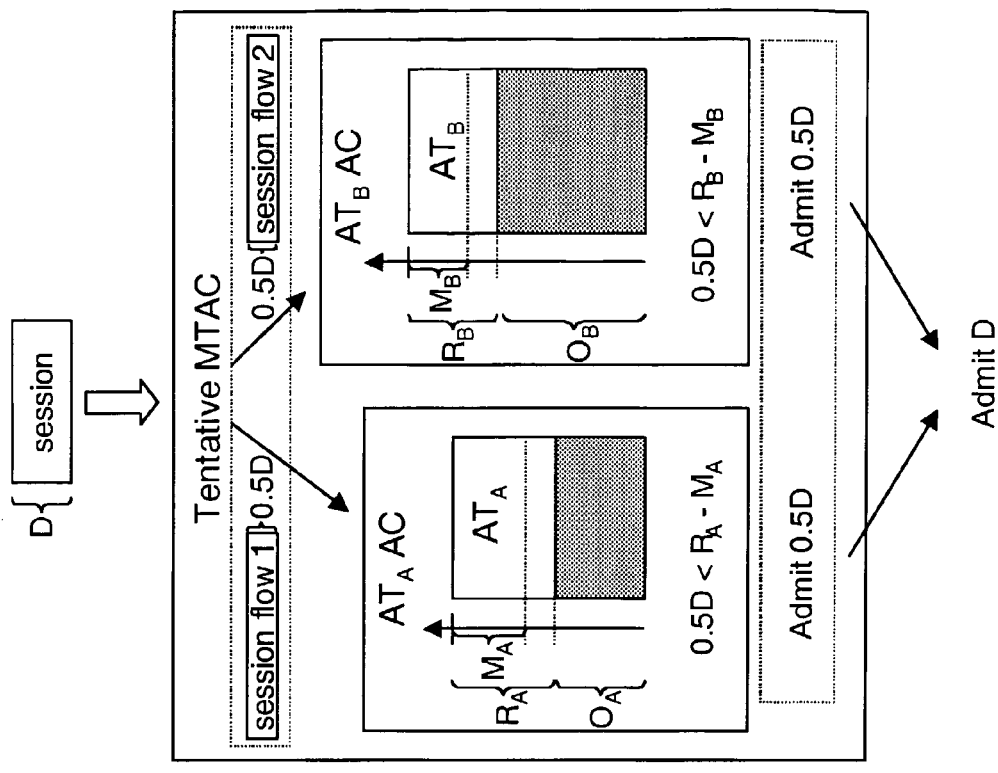
FIG. 5 illustrates principally a tentative MTA admission control according to the invention admitting a communication session demanding resource amount of D.
Figure 4:
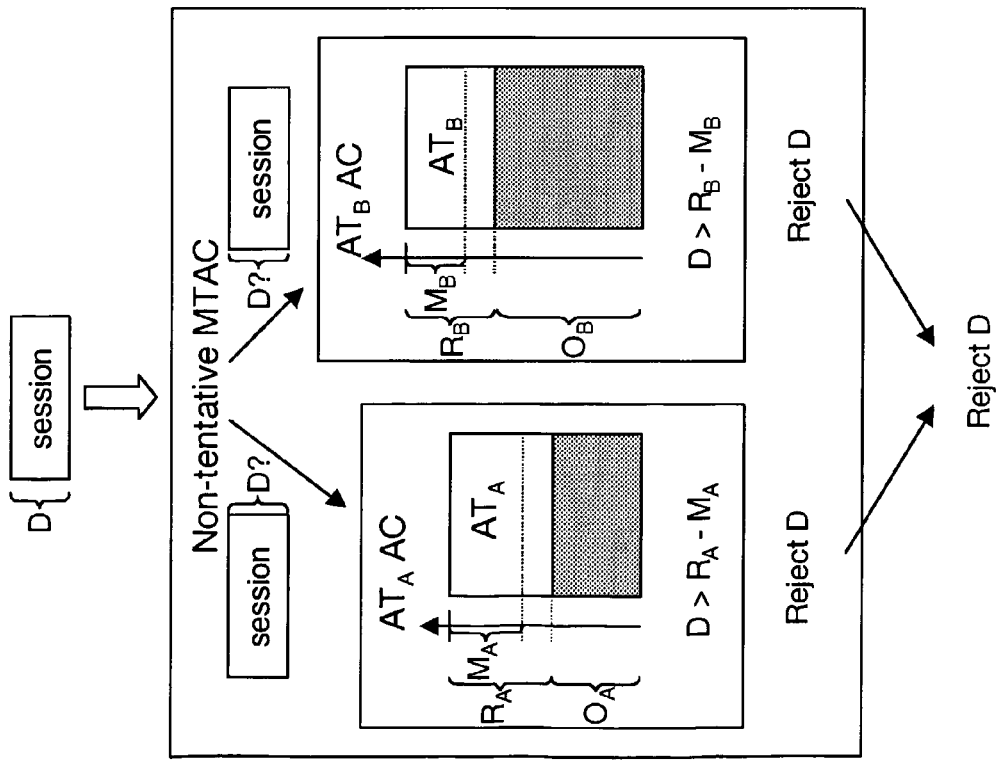
FIG. 4 illustrates how resources requested for a communication session demanding resource amount of D is rejected for admission control according to prior art.

FIGS. 4 and 5 illustrate how a session can be allowed according to the invention. In FIG. 4 resources are requested for a communication session <<session>> demanding resource amount of D. For the non-tentative MTA admission control of FIG. 4, the communication session <<session>> cannot be split into multiple data flows but requires the requested resource, D, entirely from one access technology <<$AT_A$>>, <<$AT_B$>> to be admitted. The respective admission control of the access technologies <<$AT_A$ AC>>, <<$AT_B$ AC>> investigates whether the demanded resource <<D>> can be allowed by comparing demand with unoccupied resources <<$R_A$>>, <<$R_B$>>. Each access technology has a total amount of communications resources, e.g. channel bandwidth, equal to $O_A+R_A$ and $O_B+R_B$, respectively, where $O_A$ and $O_B$ are occupied resources, and $R_A$ and $R_B$ are unoccupied resources for access technologies A <<$AT_A$>> and B <<$AT_B$>>, respectively. However, not all unoccupied resources can be allocated, but there is a respective minimum required resource margin $M_A$, $M_B$ of the access technologies <<$AT_A$>>, <<$AT_B$>>. The resource margin <<$M_A$>>, <<$M_B$>> is a margin to allow already admitted sessions to increase their resource requirement. By introducing a margin <<$M_A$>>, <<$M_B$>> that is shared between users, the access technology can admit more users, due to the various users statistically do not increase or decrease their resource requirements simultaneously. The greater the number of users, the relatively smaller the resource margin can be in relation to total unoccupied resources, for a specified probability that the entire resource margin will be required. Since the system of FIG. 4 cannot split the session into separate flows to be distributed by the different access technologies <<$AT_A$>>, <<$AT_B$>> the entire resource demand <<D>> is compared to the respective resources available for allocation to new sessions $R_A-M_A$ and $R_B-M_B$. Consequently, a requirement for admitting the session to the non-tentative multi-technology access system of FIG. 4 is that at least one of the inequalities $$D \leq R_A - M_A, \text{ and}$$

$$D \leq R_B - M_B$$

is fulfilled. The respective admission control <<$AT_A$ AC>>, <<$AT_B$ AC>> of the access technologies <<$AT_A$>>, <<$AT_B$>> investigates at least this requirement. For the example illustrated in FIG. 4 the entire session is rejected, as neither of the access technologies <<$AT_A$>>, <<$AT_B$>> has, on its own, available resources greater than the resource demand.

FIG. 5 illustrates a tentative MTA admission control <<Tentative MTAC>> according to the invention. Similar to FIG. 4, there is a request for resources of amount D for a communication session <<session>>. In contrast to FIG. 4, the MTA admission control <<Tentative MTAC>> can split the communication session into two separate data flows <<session flow 1>>, <<session flow 2>>, which can be distributed over the different access technologies <<$AT_A$>>, <<$AT_B$>>. In the illustrated example, the occupied <<$O_A$>>, <<$O_B$>> and unoccupied <<$R_A$>>, <<$R_B$>> resources are identical to those of FIG. 4. To simplify the presentation and focus on one problem at a time, let us initially assume that also the resource margins <<$M_A$>>, <<$M_B$>> are identical to those in FIG. 4. The MTA admission control <<Tentative MTAC>> investigates whether the respective flows requires fewer resources than available. In the illustrated example the communication session is split into two data flows <<session flow 1>>, <<session flow 2>> requiring equal amount of communications resources, 0.5D. The invention is, however, not restricted to symmetrical splitting of sessions. The respective admission control <<$AT_A$ AC>>, <<$AT_B$ AC>> of the access technologies <<$AT_A$>>, <<$AT_B$>> compares the resource requirement with the available resources and as both $0.5D \leq R_A - M_A$, and $0.5D \leq R_B - M_B$ turn out to be fulfilled for the example situation, both data flows <<session flow 1>>, <<session flow 2>> can be admitted and, as all session requirements described in relation to FIGS. 2 and 3 turn out to be fulfilled, the entire session with resource requirement D is admitted by the MTA admission control <<Tentative MTAC>> according to the invention.

As regards the resource margins it was, for reasons of simplicity, initially assumed that the margins <<$M_A$>>, <<$M_B$>> were set identical for the non-tentative and the tentative MTA admission controls in FIGS. 4 and 5, respectively. However, due to the fact that traffic of more users can be distributed over each access technology <<$AT_A$>>, <<$AT_B$>> of FIG. 5 than of FIG. 4, the resource margins <<$M_A$>>, <<$M_B$>> can be set smaller with a tentative MTA admission control <<Tentative MTAC>> according to the invention and schematically illustrated in FIG. 5, without increasing the probability of the entire resource margins <<$M_A$>>, <<$M_B$>> being required by allowed communication sessions and data flows. This is the case for both integrated and unintegrated access technologies.

Particular difficulties and the scarce nature of an example wireless medium stress the importance of not requiring greater resource margins than necessary.

A preferred feature of the tentative MTA admission control in FIG. 5, is the admission control <<Tentative MTAC>> not admitting allocation of resources if there are not enough available resources for all session flows. For the example flows <<session flow 1>>, <<session flow 2>>, preferably neither of the data flows <<session flow 1>>, <<session flow 2>> is admitted if not also the other data flow <<session flow 1>>, <<session flow 2>> can be admitted.

Another preferred feature of the invention is the access technology selected for each flow being based not only on general load conditions of each of the considered access technologies but also on a prediction of service efficiency or resources needed for the specific data flow in the immediate future. This is accomplished on a statistical level by determining an overall service efficiency for each access technology or by performing measurements for one or more terminals considered, not excluding a combination thereof.

The invention is not restricted to pure QoS requirements, such as data rate, average delay and delay variance (jitter). Another feature of the invention is that sessions, wholly or partially, can be controlled for distribution over one or more particular access technologies, which provide required security level. As an example, early WLANs may not provide the requested security level, while both UMTS and GSM GPRS can provide the requested security level. The MTA admission control, MTAC, according to the invention then splits the session as need be and distributes one or more security sensitive session flows over UMTS or GSM GPRS, while less sensitive information can be distributed over the less secure WLAN implementation, or no session flow is allowed to be distributed over WLAN. The security requirement is preferably included as a divisible or non-divisible requirement, mutatis mutandis, as described in relation to FIG. 2.

The preferred embodiment of the invention consequently allocates the most resource efficient access technology considering also particular requirements/parameters such as user/terminal preferences, QoS-parameters or security level, supported by some but not all access technologies.

The invention applies to both wired and wireless access technologies, where traffic can be split over a plurality of access technologies. Of particular interest, however, is multiple-technology access including wireless access technologies due to the greater difficulties of the wireless medium and the application of different technologies that has evolved and continues to evolve in order to meet the various difficulties of different environments and different uses.

In a preferred embodiment of the invention, it is applied to radio communications, i.e. the access technologies being radio access technologies, $R_A$Ts. When applied to a radio communications system, the MTA admission control is preferably co-located with a radio network controller of the radio communications system. Admission control of the various individual access technologies is preferably located to a radio network controller or an access point of the radio communications system.

The invention also applies to other wireless communications than radio communications, e.g. infrared communications and ultrasonic communications, whenever there is a plurality of access technologies of communications interest.

The invention is not intended to be limited only to the embodiments described in detail above. Changes and modifications may be made without departing from the invention. It covers all modifications within the scope of the following claims.

The invention claimed is:

1. A method for providing multi-technology access communications, comprising the steps of:
    distributing traffic using admission control over two or more access technologies;
    splitting a multi-technology access communication session into two or more data flows enabling distribution over two or more access technologies; and,
    allocating of the two or more data flows to particular access technologies, wherein said step of allocating comprises selection of one or more allocation alternatives, the selection comprising:
        a first step of preliminary reserving one or more resources;
        a second step of definitely reserving resources according to the preliminary reservation if all data flows of the communication session are admitted; and,
        a third step of admitting the session if all data flows of the communication session are admitted, and rejecting the session if not all data flows of the communication session are admitted for any of the one or more allocation alternatives.

2. The method according to claim 1, wherein said allocation alternatives are prioritized and sequentially ordered according to their priority, and that for selection of one or more allocation alternatives the preliminary reserving of one or more resources being preliminary reserving according to alternatives of relatively higher priority prior to alternatives of relatively lower priority.

3. The method according to claim 2, wherein said allocation alternatives are prioritized according to prioritization parameters including at least one of:
    one or more parameters of congestion control;
    one or more parameters of resource utilization of one or more access technologies; and,
    impact on one or more parameters of quality of service of existing allocations.

4. The method according to claim 1, wherein a resource margin of at least one access technology, included for the multi-technology access admission control, is reduced while maintaining blocking probability of admitted data flows distributed over the at least one access technology.

5. The method according to claim 1, wherein the allocation is tentative over the two or more access technologies.

6. The method according to claim 1, wherein the allocation of an access technology depends on requirements on data security or user or terminal preferences.

7. The method according to claim 1, wherein the allocation of an access technology is based on prediction of service efficiency or resource requirements including at least one of the two or more data flows.

8. The method according to claim 7, wherein the prediction is based on statistics for the access technology distributing the flow.

9. The method according to claim 7, wherein the prediction is based on measurements for a particular terminal.

10. The method according to claim 9, wherein the measurements include at least one of link quality and terminal position.

11. A method for providing multi-technology access communications, comprising the steps of:
distributing traffic using admission control over two or more access technologies;
splitting a multi-technology access communication session into two or more data flows enabling distribution over two or more access technologies; and,
allocating of the two or more data flows to particular access technologies, wherein the allocation comprises one or more tasks of the admission control comprising the steps of:
a first step of selection of a tentative set of access technologies;
a second step of evaluating and prioritizing allocation alternatives involving access technologies of the tentative set if the tentative set is non-empty; and,
a third step of selection of an allocation alternative from the prioritized allocation alternatives rendering the communication session admissible if any of the prioritized allocation alternatives can render the communication session admissible.

12. A method of multi-technology access communications, the communications including admission control distributing traffic over two or more access technologies, the method characterized in that the multi-technology access communications admission control splits a communication session received in one session data stream into two or more data flows enabling distribution over two or more access technologies;
wherein a resource margin of at least one access technology, included for the multi-technology access admission control, is reduced while maintaining blocking probability of admitted data flows distributed over the at least one access technology.

13. The method of multi-technology access communications according to claim 12, wherein the multi-technology access communications are wireless communications.

14. The method of multi-technology access communications according to claim 13 wherein the wireless communications are radio communications.

15. An apparatus for multi-technology access communications, the communications including admission control distributing traffic over two or more access technologies, the apparatus characterized by processing means for splitting a multi-technology access communication session into two or more data flows enabling distribution over two or more access technologies, and processing means for allocating the two or more data flows to particular access technologies according to user or terminal preferences or security requirements;
wherein the allocation comprises selection of one or more allocation alternatives, the selection comprising the operations:
preliminary reserving one or more resources;
definitely reserving resources according to the preliminary reservation if all data flows of the communication session are admitted; and,
admitting the session if all data flows of the communications session are admitted, and rejecting the session if not all data flows of the communications session are admitted for any of the one or more allocation alternatives.

16. The apparatus according to claim 15, further comprising processing means for prioritizing allocation alternatives and sequentially ordering the allocation alternatives according to their priority, and that for selection of one or more allocation alternatives the preliminary reserving of one or more resources being preliminary reserving according to alternatives of relatively higher priority prior to alternatives of relatively lower priority.

17. The apparatus according to claim 16, wherein said processing means for prioritizing allocation alternatives according to prioritization parameters including at least one of:
one or more parameters of congestion control;
one or more parameters of resource utilization of one or more access technologies; and,
impact on one or more parameters of quality of service of existing allocations.

18. An apparatus for multi-technology access communications, the communications including admission control distributing traffic over two or more access technologies, the apparatus characterized by processing means for splitting a multi-technology access communication session into two or more data flows enabling distribution over two or more access technologies, and processing means for allocating the two or more data flows to particular access technologies according to user or terminal preferences or security requirements;
wherein the allocation comprises one or more tasks of the admission control comprising the operations of:
selection of a tentative set of access technologies;
evaluating and prioritizing allocation alternatives involving access technologies of the tentative set if the tentative set is non-empty; and,
election of an allocation alternative from the prioritized allocation alternatives rendering the communication session admissible if any of the prioritized allocation alternatives can render the communication session admissible.

* * * * *

UNITED STATES PATENT AND TRADEMARK OFFICE
CERTIFICATE OF CORRECTION

PATENT NO.       : 7,835,320 B2
APPLICATION NO.  : 11/574713
DATED            : November 16, 2010
INVENTOR(S)      : Magnusson et al.

It is certified that error appears in the above-identified patent and that said Letters Patent is hereby corrected as shown below:

On the Title Page, in item (75), under "Inventors", in Column 1, Line 2,
delete "Linkoping" and insert -- Linköping --, therefor.

On the Title Page, in item (75), under "Inventors", in Column 1, Line 3,
delete "Ronninge" and insert -- Rönninge --, therefor.

In Column 5, Line 30, delete "<<$AT_{C>>}$." and insert -- <<$AT_C$>>. --, therefor.

In Column 10, Line 14, delete "$R_A$Ts." and insert -- RATs. --, therefor.

Signed and Sealed this
Twenty-fourth Day of May, 2011

David J. Kappos
*Director of the United States Patent and Trademark Office*